July 18, 1933.  F. A. BROWNELL  1,918,736

OIL STOP ELECTRIC CABLE JOINT

Filed Aug. 7, 1929  2 Sheets-Sheet 1

INVENTOR.
Frank A. Brownell
BY
George D. Richards
ATTORNEY

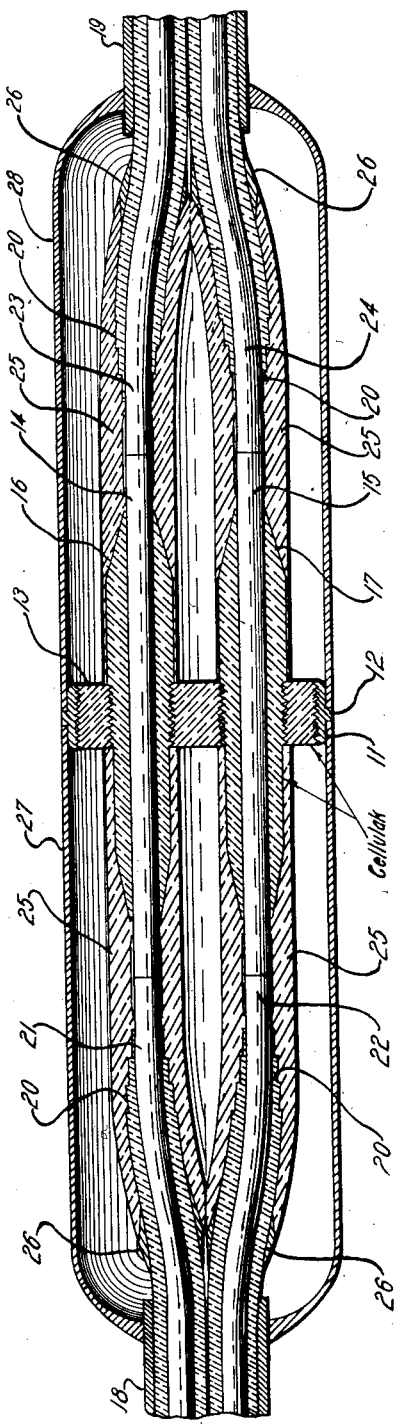

Patented July 18, 1933

1,918,736

UNITED STATES PATENT OFFICE

FRANK A. BROWNELL, OF METUCHEN, NEW JERSEY

OIL STOP ELECTRIC CABLE JOINT

Application filed August 7, 1929. Serial No. 384,208.

This invention relates, generally, to underground electrical high voltage cable joints; and the invention has reference, more particularly, to oil stop cable joints.

Oil stop cable joints are used to confine oil or other insulating fluid material so that the same is not permitted to flow from one cable section to another through the joint, thereby retaining the fluid of one cable section within that section. These joints are employed in connecting cable sections on grades where it is essential to retain the desired quantity of oil or compound in each adjoining cable section, and in such cases if an oil stop or seal is not employed, the insulating fluid tends to drain into the cable portions which are lowermost in grade, thereby tending to create internal fluid pressures within the latter cable portions with risk or disrupting or otherwise displacing cable sheathing materials and consequent loss of oil and likelihood of the admission of moisture; and, furthermore, such draining of oil from the upper cable portions greatly reduces electric strength thereof. These joints are also used in connection with potheads installed on poles or where it is necessary to use two different fluid compounds for filling the joint such as where a paper insulated cable is joined to a rubber insulated cable, in which case it is necessary to prevent contact of the oil of the paper insulated cable with the rubber of the rubber insulated cable.

Heretofore, it has been common practice to employ metal barriers or oil stops in joints, and as these stops are at ground potential, enormous electrical stresses are often set up in the insulation surrounding the conductors which extend through apertures in the oil stop, thereby tending to rupture and destroy such insulation. Such metal stop joints commonly employ gaskets and compression rings for sealing the joint around the conductor insulation, but in practice such sealing means is not satisfactory and permits leakage of oil.

The principal object of the present invention is to provide a novel oil stop cable joint employing a rigid impermeable material having all the mechanical qualities of a metal stop or barrier but which also possesses highly efficient insulating characteristics, thereby eliminating dangerous electrical stresses in the conductor insulation at the oil stop, while at the same time so mechanically constructing and arranging said joint and stop as to render the same absolutely oil tight in use.

Other objects of this invention, not at this time more particularly enumerated, will be clearly understood from the following detailed description of the same.

The invention is clearly illustrated in the accompanying drawings, in which:—

Figure 3 is a longitudinal sectional view of a cable joint employing the stop structure of this invention.

Similar characters of reference are employed in all of the hereinabove described views to indicate corresponding parts.

Figure 2:
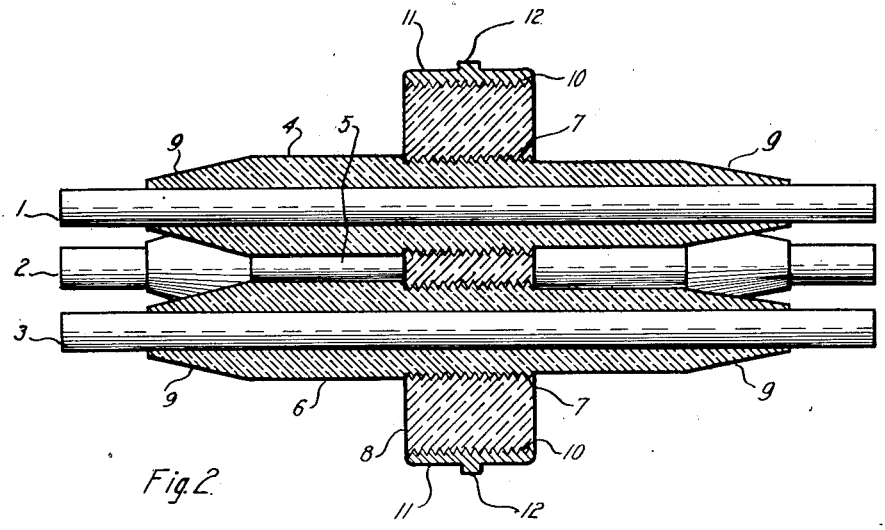
Figure 2 is a sectional view taken along line 2—2 of Figure 1.
Figure 1:
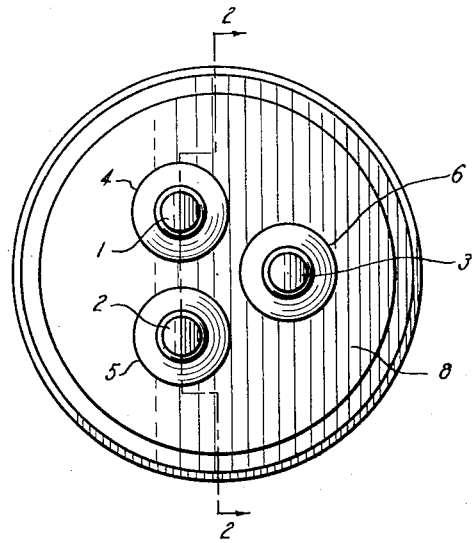
Figure 1 is an end view of the novel oil stop of this invention and illustrates three bushed conductors extending through said oil stop.

Referring now to Figures 1 and 2 of the said drawings, the reference numerals 1, 2 and 3 designate rod conductors made of electrical conducting material and preferably copper. Rod conductors 1, 2 and 3 extend snugly through and are sealed within insulating bushings 4, 5 and 6. Insulating bushings 4, 5 and 6 are made of a high grade insulating material and preferably of cellulak, which comprises paper and shellac, varnish or suitable insulating compound combined together by heat and pressure. The paper material is wrapped tightly around each of the conductors in a plurality of successively overlying layers intermediate which is the insulating compound, which under heat and pressure, causes the paper layers to firmly adhere one to another. The resultant bushing is then baked so as to form a strong, tough bushing which may be machined in much the same manner as metal. Bushings 4, 5 and 6 are formed so as to have tapered conical end portions 9.

The central portions of the bushings 4, 5 and 6 are threaded as indicated by the reference numeral 7 and these bushings are adapted to be screwed into circumferentially arranged, equally spaced threaded bushing apertures provided in the insulating stop or barrier plate 8. Stop or barrier plate 8 is of cylindrical shape and is also made of cellulak. In Figs. 1 and 2 three bushing apertures are shown as extending longitudinally through the barrier plate, but it is to be understood that a greater or lesser number of such apertures may be used in accordance with the requirements of any particular installation. The portions of bushings 4, 5 and 6 that extend to the right of the threads on these bushings in Figure 2 are of reduced diameter to enable the ready insertion of such reduced portion through the bushing apertures in the barrier plate.

Preparatory to inserting the bushings 4, 5 and 6 into their corresponding apertures in the barrier plate 8, the threaded portions 7 are coated with insulating varnish so that when these bushings are screwed into the barrier plate a tight joint is effected. These bushings are screwed into the carrier plate until the shouldered ends of the threaded portions 7 jam against a face of the barrier plate, which jamming action further enhances the tightness of the joint between the bushings and the barrier plate. The outer periphery of the barrier plate is threaded at 10 and, after these threads have been coated with insulating varnish, a connecting ring 11 having an internal thread is screwed tightly upon the barrier plate. The connecting ring 11 is provided with a central outwardly extending peripheral flange 12, the purpose of which will be later described. The assembled barrier unit comprising the conductors, their insulating bushings, the barrier plate and the connecting ring is then baked in an oven so as to become a unitary substantially homogeneous mass, thereby insuring a completely sealed joint between the barrier plate, the bushings and the connecting ring.

Figure 3 illustrates the manner in which the barrier unit is assembled in a cable joint. Two rod conductors 14 and 15 and their corresponding bushings 16 and 17 are shown extending through the barrier plate 13 of the stop unit of Figure 3. In assembling the cable sections 18 and 19 with the barrier unit, the lead sheathing of these cable sections is cut back for a distance from the ends of the cable conductors 21 to 24, and the paper insulation of the conductors is also cut back in steps as indicated at 20. The ends of the conductors 21, 23 and 22, 24 are brought into abutting relation with the ends of conductors 14 and 15 respectively, and these abutting ends are secured together, as by welding, soldering, or other mechanical coupling, whereupon varnished cambric, paper or other insulating material 25 is wrapped or formed about the exposed ends of the conductors in overlying relation with respect to the cable insulation and the insulating bushings of the barrier unit. Lead foil 26 is illustrated as wrapped around the cable conductor insulation near the ends of the cable joint; the same being usually employed to avoid high electrical stresses at these points.

The cable joint sheath or housing is made in two cylindrical half portions 27 and 28. These half portions of the cable joint casing are telescoped over the cable sections 18 and 19 preparatory to assembling the barrier unit with the cable sections, and after this barrier unit has been assembled with the cable sections, the half portions 27 and 28 move toward one another so that the opposed open ends slide over and frictionally engage the outer peripheral surface of the connecting ring 11. The inner ends of the cable joint sheath half portions are brought into abutting relation with the sides of the peripheral flange 12 and are sealed upon the connecting ring as by wiping. The outer ends of the casing or sheath half portions 27 and 28 are sealed upon the lead casing of cable sections 18 and 19 as by wipe joints, whereupon the joint is filled with a suitable insulating oil or compound, which while providing an efficient insulator also serves to exclude air and moisture from the interior of the joint.

It will thus be noted that the novel barrier unit of this invention is readily assembled with two adjoining cable sections, and the joint so produced is not only of simple design, but acts to positively retain the insulating oil in each adjoining cable section, so as to positively prevent any oil leaking through the barrier plate from one cable section to another, especially when the cable is installed on a grade.

Since the barrier plate 8 is comprised of a material of electrical insulating qualities, there is no conductive material at ground potential in the oil stop structure (as is the case when metal barrier plates are utilized), and consequently the conductor insulating bushings are not subject to the high electric stresses ordinarily met with in oil stop joints having metallic barriers, and consequently the life of the bushings and the whole joint structure is greatly prolonged.

Also, owing to the high insulating qualities of cellulak and the use of this material in fabricating the insulating bushings and the barrier plate, the resulting joint is free from great or dangerous electric stresses.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a cable joint, a barrier unit comprising, an insulating barrier plate, an electric conductor extending through an aperture in said barrier plate, an insulating bushing surrounding said conductor, said bushing being threaded through the aperture in said barrier plate, and having a shoulder to abut a side of said barrier plate to effect a tight juncture with the latter. and a metallic connecting ring threaded upon said barrier plate and being adapted for connection to the sheathing of said cable joint.

2. A barrier unit for cable joints comprising, a barrier plate consisting in a composite body of laminated fibrous material and shellac consolidated by heat and pressure, said plate having an aperture for the extension of a rod conductor therethrough, a rod conductor bushing also consisting in a composite body of laminated fibrous material and shellac consolidated by heat and pressure, said bushing having at one end a portion of reduced diameter forming a shoulder, said reduced portion having screw threads formed thereon whereby said bushing is threaded through said plate aperture with said shoulder abutting a face of said plate to thus form a fluid tight joint between said bushing and plate, and a metallic connecting ring threaded upon said barrier plate, said connecting ring having a peripheral flange for securing said barrier plate to the sheathing of said cable joint.

3. A barrier unit for cable joints comprising, a barrier plate consisting in a composite body of laminated fibrous material and shellac consolidated by heat and pressure, said plate having an aperture for the extension of a rod conductor therethrough, a rod conductor bushing of insulating material engaged through said plate aperture so as to form a fluid tight juncture with said plate, and a metallic attaching ring encircling and secured to the periphery of said barrier plate for attaching the latter to the wall of the cable joint.

FRANK A. BROWNELL.